March 13, 1962     E. C. WELCH     3,025,445
ROTOR EXCITED STEPPER MOTOR
Filed July 2, 1959

INVENTOR
ELVIN C. WELCH
BY *Elliott & Pastoriza*
ATTORNEYS

United States Patent Office 3,025,445
Patented Mar. 13, 1962

3,025,445
ROTOR EXCITED STEPPER MOTOR
Elvin C. Welch, Culver City, Calif., assignor to Automation Development Corporation, a corporation of California
Filed July 2, 1959, Ser. No. 824,709
6 Claims. (Cl. 318—444)

This invention relates generally to control systems and more particularly to a motor control system in which a shaft is caused to rotate in discrete steps in response to electrical pulses.

Devices for converting electrical pulses into discrete steps of mechanical shaft rotation are known in the art as stepper motors. Most such devices operate on the principle of establishing a resultant magnetic field by means of orthogonally positioned stator windings and causing the field to step around in discrete directions by energizing various combinations of the stator windings in response to the electrical pulses. The rotor itself may be magnetized so that it will align itself with and follow the resultant magnetic field to cause a shaft to rotate in discrete steps.

The complexity of stepper motors of the foregoing type increases with the number of steps required of the rotor member. For example, for each discrete position of the stator magnetic field a logic circuit of some type must be energized to effect the positioning. If the rotor is to be stepped in ninety degree arcs, the logic circuit must be capable of four different conditions sequentially following each other in response to a series of identical pulses. Similarly, if the rotor is to be stepped in arcs of forty-five degrees, at least eight different conditions of the logic circuit are required.

By the same analysis a 180° stepper motor should require only a two condition logic circuit, but as a practical matter this cannot be achieved because the rotor can step 180° by moving through equal arcs in either direction. Therefore, some third means is necessary to step the rotor in the desired direction. Once the foregoing has been achieved, simple mechanical gearing can be employed between the rotor and shaft to divide the stepping of the rotor into any number of incremental steps.

Stepper motors which only require a two-condition logic circuit are desirable in that the number of electrical components is minimized with resulting decreased cost, increased reliability, compactness, and small mass.

With the foregoing in mind, it is a primary object of the present invention to provide an improved stepper motor which requires in its logic circuit only two conditions and yet which may be stepped in either a clockwise or counter clockwise direction in response to a series of electrical pulses without further introduction of components into the logic circuit itself.

More particularly, it is an object to provide an improved stepper motor in which the rotor itself performs an active part in effecting the stepping action to the end that an extremely simplified circuit may be provided thereby greatly reducing manufacturing costs.

Another object is to provide a stepper motor in which the rotor executes discrete steps of 180°.

Still another object is to provide a stepper motor of the foregoing type in which the rotor can be made to step through alternate arcs of 45° and 135° without modification of any components in the logic circuit.

Briefly, these and other objects and advantages of the invention are attained by providing first stator windings energized to establish a magnetic field in a given constant direction. Alternatively, a permanent magnet could be used for this purpose. A rotor member in turn is provided with rotor windings for establishing a magnetic field which will normally align itself with the given direction of the stator magnetic field. Also included in the circuit is a control means in the form of a bi-stable circuit connected to the rotor windings and responsive to a series of electrical pulses for switching between first and second conditions in such a manner as to reverse the magnetic field established by the rotor windings 180° each time the condition of the bi-stable control circuit is altered. By this arrangement, the magnetic field of the rotor will either be aligned with the given direction of the stator magnetic field or opposed thereto. When in alignment, the rotor will be retained in a given position. When opposed thereto, the rotor will be in an unstable position and will tend to rotate through 180° to align its field with the stator field.

In order to initiate motion of the rotor in a desired direction when its field is opposed to that of the stator magnetic field, there are provided additional stator windings for momentarily establishing a magnetic field at right angles to the given direction of the first mentioned stator magnetic field. These second stator windings are in turn connected to receive the same series of electrical pulses fed to the bi-stable control circuit. In consequence, a magnetic field will be momentarily established at right angles to the given stator magnetic field and will thus initiate motion of the rotor in a given circular direction. By providing two input means connected to the second stator windings the initiating magnetic field may be established in either direction thereby moving the rotor in either a clockwise direction or a counter clockwise direction depending upon the input means to which the electrical pulses are applied.

The input pulses themselves may be modified to square wave shape of given amplitude and equal duty cycles whereby the field established by the second stator windings is of a magniutde and duration to effect stepping of the rotor through altrenate arcs of 45° and 135°.

A better understanding of the preferred embodiments of the invention will be had by now referring to the accompanying drawings in which.

Figure 1:
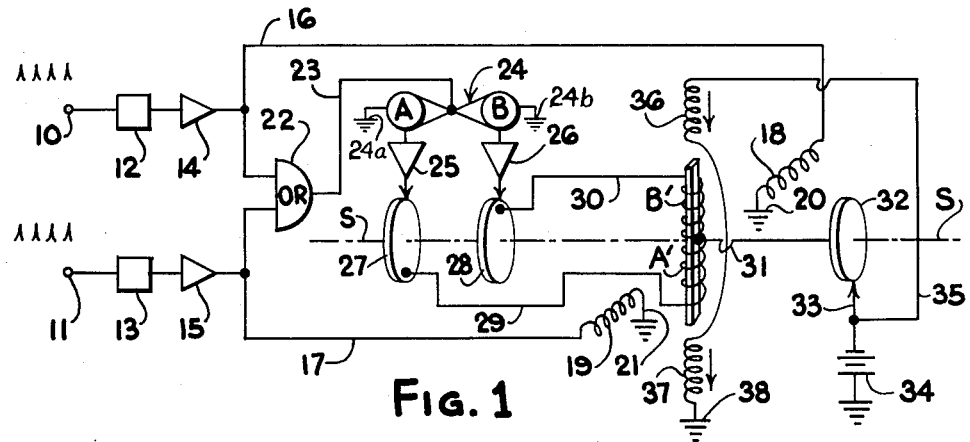
FIGURE 1 is a schematic view of the stepper motor partly in block form in accordance with the invention.

Referring first to FIGURE 1, there is shown at the left hand portion of the drawing, first and second input terminals 10 and 11 for receiving a series of electrical pulses indicated schematically. Each of the first and second input means includes wave shaping circuits 12 and 13 with amplifiers 14, 15 for shaping the pulses and feeding the shaped pulses to leads 16 and 17 respectively. As shown, these leads connect to first and second sets of stator windings 18 and 19, the other ends of which are grounded at 20 and 21, respectively. The wave shaping circuits 12 and 13 and amplifiers 14 and 15 are arranged to generate pulses having a fixed duration and will provide this shape in response to any type of spike or input pulse. By this ararngement the magnitude and shape of the particular actuating input pulses is, within limits, of no consequence.

As shown in FIGURE 1, the input pulses from the amplifiers 14 and 15 both feed into a selecting circuit 22. The circuit 22 passes either pulses from the amplifier 14 or pulses from the amplifier 15, but will not allow a pulse from amplifier 14 to pass to line 17 or conversely, a pulse from amplifier 15 to pass to line 16.

From the output of the circuit 22, there is provided a lead 23 connected to a control means in the form of a bi-stable circuit 24. Such bi-stable circuits are well known in the art and have the property of switching back and forth between two conditions in response to electrical triggering pulses. For example, one side of the bi-stable circuit 24 is indicated A, and when this side is active, a conducting path is provided to ground at 24a. Upon reception of a pulse through the lead 23, the side A is cut off and side B activated to provide a conducting path to ground 24b. Reception of the next pulse then renders side B inactive and side A active, and so forth.

Output amplifiers 25 and 26 pass from the respective sides A and B of the bi-stable control circuit 24 to two slip rings 27 and 28 mechanically connected for rotation with the shaft of the stepper motor, as indicated by the dashed dot line S. As shown, these slip rings are respectively connected through leads 29 and 30 to a split rotor coil having sides A' and B' and including a center tap lead 31 connected to a third slip ring 32 engaged by a brush 33. The brush 33 will provide voltage from a battery 34 to one or the other of the split coils A' or B' of the rotor depending upon which side A or B of the bi-stable control circuit 24 is energized to pass such signal to ground at 24a or 24b. By this arrangement, a magnetic field can be established by the rotor in one direction or in an opposite direction 180° from said one direction in accordance with whether the side A or B of the bi-stable circuit is conductive.

The voltage from battery 34 is also passed through a lead 35 to a first pair of stator windings 36 and 37 connected together as shown and grounded at 38. As a consequence, a constant magnetic field is established by these first stator windings in one given direction as indicated by the vertical arrows. Alternatively, these coils could be replaced by a permanent magnet.

Figure 2:
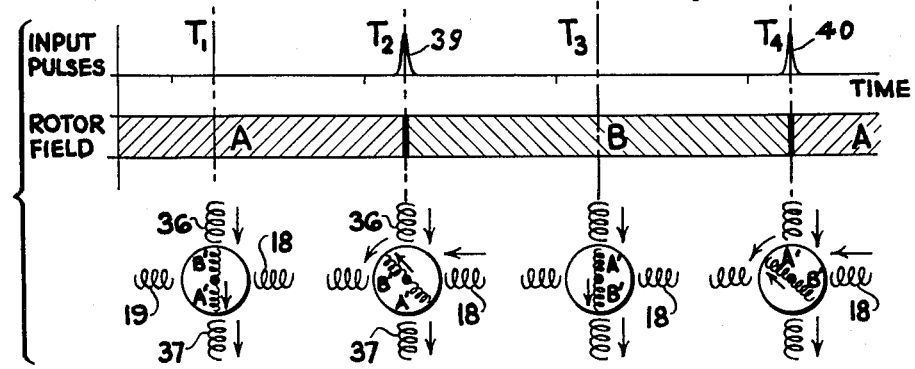
FIGURE 2 illustrates time and rotor position graphs useful in explaining the operation of the stepper motor; and, FIGURE 3 illustrates graphs similar to those of FIGURE 2 for explaining a modified type of operation of the stepper motor.

Referring now to the top graph of FIGURE 2 there is illustrated a series of pulses 39, 40 as would appear at the input of either terminal 10 or 11 of FIGURE 1. Beneath this graph on a corresponding time scale are block portions labeled A and B. The shaded portion A indicates the time during which side A of the bi-stable control circuit 24 of FIGURE 1 is conducting while the shaded portion B indicates the time during which the side B of the bi-stable circuit is conducting. It will be noted that the leading edges of the pulses 39, 40 initiate the switching between condition A and condition B in the bi-stable control circuit.

Certain instances of time are represented by the vertical dashed lines $T_1$, $T_2$, $T_3$, and $T_4$ and under each of these lines there is shown a corresponding representation of the position of the rotor halves $A^1$, $B^1$.

In a first version of the motor, the wave shaping circuits 12, 13 and power amplifiers 14, 15 are omitted so that simple trigger pulses or spikes as indicated at 39, 40 are fed to the leads 16 or 17. In this case, 180° stepping action is achieved.

With reference to FIGURES 1 and 2 the operation of this first version will now be described. Considering first the conditions at the time $T_1$, for example, it is evident that no pulse is being received from the input terminal 10 in the lead 16. Accordingly, the coil 18 as indicated schematically in the diagram under the line $T_1$ and also in FIGURE 1 will not be energized. Therefore, the only electro-magnetic fields present will be the constant field in the coils 36 and 37 energized continuously by the battery 34 as shown by the arrows; and a rotor magnetic field established by the winding half A' of the rotor. This field is provided by voltage from the battery 34 passing through the slip ring 32 through the winding A', lead 29, slip ring 27, and amplifier 25 to side A of the bi-stable control circuit 24 to ground. This conducting path is established since side A is conducting as indicated by the shaded block A in FIGURE 2 at time $T_1$. In the absence of any further pulses at the input, the rotor will align itself with the magnetic field established by the stator windings 36 and 37 as shown.

Upon reception of the pulse 39 in FIGURE 2 at the time $T_2$ the bi-stable control circuit 24 will be triggered to render side A non-conducting and side B conducting. As a consequence, voltage from the battery 34 will pass through the slip ring 32 and the coil half B' of the rotor, lead 30, slip ring 28, amplifier 26 to ground through side B, thereby reversing the magnetic field established by the rotor 180° as indicated by the arrow in the diagram below $T_2$. Simultaneously, the winding 18 of the stator will be momentarily energized for the duration of the pulse 39 and the magnetic field established will be at right angles to the steady magnetic field of the first stator windings 36 and 37 as indicated by the arrow. The resultant magnetic field from these two stator fields will initiate motion of the rotor in a counter-clockwise direction, and the rotor will be caused to swing around to the position illustrated in the diagram under $T_3$ wherein the magnetic field established in the rotor coil B' is in alignment with the steady magnetic field from the coils 36 and 37, the momentary field in coil 18 having ceased upon termination of the pulse 39.

The rotor will remain in the position illustrated under $T_3$ so long as the side B of the control circuit 24 remains conducting. The rotor will stay in this set position until reception of the next pulse 40 at time $T_4$. The leading edge of this pulse will change the state of the bi-stable control circuit 24 to render the side B non-conducting and the side A conducting again. As a consequence, the coil half A' of the rotor will then be energized to reverse the magnetic field in the rotor. The pulse will also momentarily energize the stator field winding 18 to establish a magnetic field at right angles to the steady magnetic field as indicated by the arrow in the diagram under $T_4$. The resultant stator magnetic field will then cause the rotor to commence turning in a counter-clockwise direction as indicated. As before, this field will then oppose the steady magnetic field of the first stator windings and cause the rotor to move on throughout the 180° to its initial position illustrated under $T_1$.

It will be evident accordingly that upon reception of each pulse, the rotor is stepped through an arc of 180° so that two pulses will cause the rotor to rotate through a complete 360°.

If, in the foregoing example of operation, pulses are applied to the input terminal 11 rather than the input terminal 10, the resulting pulses will be as shown in FIGURE 2 but rather than pass to the stator coil 18, they will be passed to the stator coil 19 through the lead 17 thereby establishing a momentary magnetic field in an opposite direction to that formerly established by the field winding 18. As a result the rotor will be caused to step in a clockwise direction since the resultant of the momentarily established stator magnetic field by the winding 19 and the steady field from the windings 36 and 37 will initiate motion of the rotor in this direction. It is seen accordingly that either counter-clockwise or clockwise rotation of the rotor can be achieved depending upon to which input terminal 10 or 11 the control pulses are applied.

In a second version of the motor, the operation can be modified to step the rotor in alternate steps of 45° and 135°. This is achieved by applying equal duty cycle square shaped input pulses of a given power directly to the line 16 or 17. In the event such pulses are not available they may be generated in response to trigger pulses of a constant pulse repetition frequency supplied to the terminal 10 or 11 by the wave shaping circuits 12, 13 and power amplifiers 14, 15. Since the wave shaping circuits 12 and 13 provide fixed time duration pulses, the input pulse repetition frequency is adjusted to have a period equal to twice such fixed time duration. Since equal duty cycle square wave pulses are indicated at 41 and 42 in the top graph of FIGURE 3.

Figure 3:
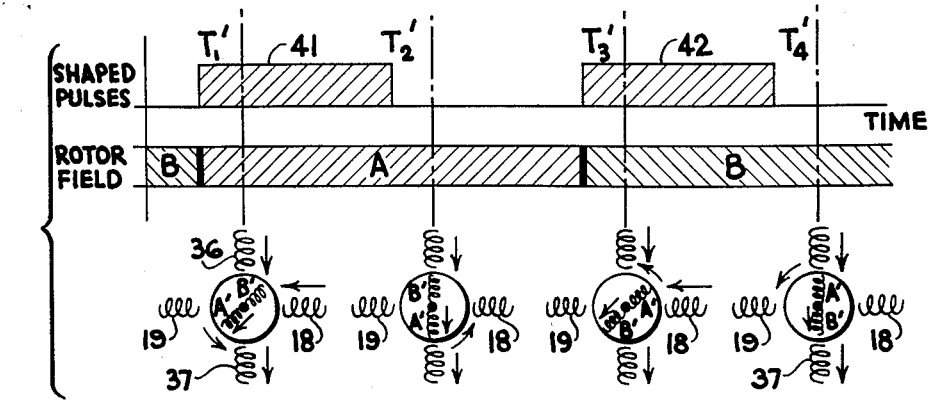

The stepping and positioning of the rotor at various times represented by lines, $T_1'$ $T_2'$, $T_3'$, and $T_4'$ for square pulses is illustrated in FIGURE 3 below each of these lines. It will be evident that the operation is similar to that of FIGURE 2 except that as a consequence of the square wave pulse, the coil 18 will be energized for a finite length of time to establish a resultant stator field at 225°. In consequence the rotor will assume this position until cessation of the square wave at which time it will then step through the remaining 45° or 135° as the case may be to align vertically with the field established by the stator windings 36 and 37.

Thus, with reference to FIGURE 3, at $T_1'$ rotor coil A' and stator coil 18 are energized to produce a resultant field at 225° and the rotor is shown aligned with this field. After cessation of the pulse 41 at time $T_2'$, the rotor turns in a counterclockwise direction through 45° to align itself with the steady stator field.

Upon reception of the pulse 42, the rotor field is reversed since coil B' is energized upon switching of the bi-stable circuit by the leading edge of pulse 42. Simultaneously the coil 18 is energized and provides a steady field for the duration of the pulse. Thus at time $T_3^1$ the rotor will have swung through 135° to the position illustrated under $T_3^1$. Upon cessation of pulse 42, coil 18 will be de-energized leaving only the vertical stator field established by coils 36 and 37. The rotor will then swing through 45° to this position as illustrated under $T_4^1$. When the leading edge of the next pulse is received the rotor will step around to the position illustrated under $T_1^1$.

It will be evident from the foregoing that stepping through four distinct positions can be achieved to effect a 360° rotation in response to only two pulses, the leading and trailing edges of each pulse effecting the steps in alternate arcs of 45° and 135°.

If the square wave pulses are derived from the input terminal 11 and amplifier 15, the foregoing described stepping action is identical but takes place in a clockwise direction, the resultant magnetic field being established at 135° as a consequence of energization of coil 19, rather than at 225°.

From the above description, it will be apparent that the present invention provides extremely simplified types of stepper motors. By employing the rotor itself as a magnetic field generating member in the circuit, which field can be reversed through 180° in response to reception of pulses to interact with the stator fields, much of the circuitry formerly employed in the logical portion of the stepper motor can be eliminated. For example, the present invention requires only the bi-stable control means 24 as a logic portion of the circuit, the stator windings 18 and 19 and co-operating rotor windings A' and B' serving to effect the desired stepping action.

While only certain embodiments of the invention have been shown and described, various modifications that fall clearly within the scope and spirit of the invention will occur to those skilled in the art. The stepper motor is, therefore, not to be thought of as limited to the specific examples set forth for illustrative purposes.

What is claimed is:

1. A stepper motor comprising: stator windings for establishing a stator magnetic field in one direction; a control means switching between first and second conditions in response to electrical pulses; a rotor having rotor windings connected to said control means for establishing a rotor magnetic field in response to said first condition of said control means and in a reverse direction in response to said second condition of said control means; motion initiating means responsive to said pulses for establishing a magnetic field at an angle to said one direction for initially starting rotation of said rotor in a first circular direction; and input means for passing said electrical pulses to said control means and said motion initiating means.

2. A 180° stepper motor comprising: first and second stator windings; means for continuously energizing said first stator windings to establish a first magnetic field in one direction; a control means; a rotor having a split winding connected to said control means for establishing a magnetic field in said one direction in response to one condition of said control means and in a reverse direction 180° from said one direction in response to an alternate condition of said control means; and input means connected to said control means and to said second stator windings for passing a series of actuating electrical pulses thereto, said second stator winding being momentarily energized in response to each of said pulses to momentarily establish a second magnetic field at right angles to said first magnetic field, said control means simultaneously switching between said one condition and said alternate condition in response to each of said pulses whereby said rotor is stepped 180° in response to each of said pulses.

3. The subject matter of claim 2, in which said second stator windings include first and second sets of windings and said input means including first and second inputs connected respectively to said first and second sets of windings, said first set of windings establishing a magnetic field at right angles to said one direction in response to pulses received on said first input and said second set of windings establishing a magnetic field in an opposite direction to the field established by said first set of windings in response to pulses received on said second input whereby said rotor can be stepped in counter-clockwise and clockwise directions in response to pulses received on said first and second inputs respectively.

4. A stepper motor comprising: first and second stator windings; means for continuously energizing said first stator windings to establish a first magnetic field in one direction; input means connected to said second stator windings for establishing a second magnetic field at right angles to said one direction in response to each of a series of electrical pulses applied to said input means, said second magnetic field being of a duration corresponding substantially to the width of each of said pulses; a bi-stable control means connected to receive said input pulses and switching between first and second stable positions in response to each of said pulses; and a rotor having windings connected to said bi-stable control means and responsive to said first and second stable positions respectively for establishing a rotor magnetic field in one direction and in a reverse direction respectively, whereby said rotor magnetic field aligns itself with said first magnetic field and upon reception of a pulse said rotor steps to a position to align its magnetic field with the resultant of said first and said second magnetic fields established by said first and second stator windings so that said rotor steps through alternate arcs of 45° and 135°.

5. The subject matter of claim 4, in which said input means includes wave shaping circuits and power amplifiers to provide input pulses of equal duty cycles and of a given magnitude.

6. The subject matter of claim 5, in which said input means comprises first and second inputs, said second stator windings being responsive to pulses from said power amplifiers in said first input for establishing said second magnetic field in a given direction to step said rotor in a counter-clockwise direction and responsive to pulses from said power amplifiers in said second input for reversing said second magnetic field 180° from said given direction to step said rotor in a clockwise direction whereby counter-clockwise and clockwise stepping of said motor takes place in response respectively to pulses received from said first and second inputs.

References Cited in the file of this patent

UNITED STATES PATENTS 2,706,270 Steele _____ Apr. 12, 1955